United States Patent
Baun et al.

(10) Patent No.: US 7,277,223 B2
(45) Date of Patent: Oct. 2, 2007

(54) APPARATUS AND METHODS FOR FOCUSING AND COLLIMATING TELESCOPES

(75) Inventors: Kenneth W. Baun, Trabuco Canyon, CA (US); Brian Tingey, Fountain Valley, CA (US); Ghassan El-Khatib, Long Beach, CA (US)

(73) Assignee: Meade Instruments Corporation, Irvine, CA (US)

( * ) Notice: Subject to any disclaimer, the term of this patent is extended or adjusted under 35 U.S.C. 154(b) by 0 days.

(21) Appl. No.: 11/341,790

(22) Filed: Jan. 27, 2006

(65) Prior Publication Data

US 2006/0132908 A1 Jun. 22, 2006

Related U.S. Application Data

(63) Continuation-in-part of application No. 10/899,221, filed on Jul. 26, 2004.

(60) Provisional application No. 60/684,631, filed on May 25, 2005.

(51) Int. Cl.
G02B 23/00 (2006.01)
(52) U.S. Cl. ...................... 359/399; 359/425
(58) Field of Classification Search ............... 359/399
See application file for complete search history.

(56) References Cited

U.S. PATENT DOCUMENTS

| 4,123,136 A | 10/1978 | Dahab et al. |
| 4,342,503 A | 8/1982 | Shafer |
| 5,133,050 A | 7/1992 | George et al. |
| 5,150,260 A | 9/1992 | Chigira |
| 5,191,469 A | 3/1993 | Margolis |
| 5,465,170 A | 11/1995 | Arimoto |
| 5,734,516 A | 3/1998 | Sayede |
| 6,061,175 A | 5/2000 | Watters |
| 6,278,100 B1 | 8/2001 | Friedman et al. |
| 6,323,996 B1 | 11/2001 | Watters |
| 6,327,081 B1 * | 12/2001 | Persha .................. 359/425 |
| 6,369,942 B1 | 4/2002 | Hedrick et al. |

(Continued)

FOREIGN PATENT DOCUMENTS

DE 10249177 A1 * 5/2004

(Continued)

OTHER PUBLICATIONS

International Searching Authority, Notification of Transmittal of the International Search Report and the Written Opinion of the International Searching Authority, for International Application No. PCT/US2006/020405, date of mailing Sep. 22, 2006 (9 pages).

Primary Examiner—Mark A. Robinson
Assistant Examiner—Lee Fineman
(74) Attorney, Agent, or Firm—Knobbe, Martens, Olson & Bear, LLP

(57) ABSTRACT

A telescope capable of motorized focus and/or collimation. The telescope includes control electronics capable of correcting the focus and/or collimation based on identified information, such as, for example, information about optical or other elements of the telescope, information about a user or imaging device, or the like. In various embodiments, such identified information is acquired through radio frequency identification (RFID) technologies. In other embodiments, an automated system controls the actuators based at least in part upon identification information, such as through user or device recognition.

23 Claims, 7 Drawing Sheets

U.S. PATENT DOCUMENTS

| | | |
|---|---|---|
| 6,404,547 B1 | 6/2002 | Hull |
| 6,505,780 B1 * | 1/2003 | Yassin et al. ............... 235/492 |
| 2002/0150282 A1 * | 10/2002 | Kinsella ..................... 382/124 |
| 2003/0137726 A1 | 7/2003 | Seifert et al. |
| 2004/0068564 A1 * | 4/2004 | Snoddy et al. .............. 709/225 |
| 2004/0190132 A1 * | 9/2004 | Laschke et al. ............. 359/385 |
| 2005/0001024 A1 * | 1/2005 | Kusaka et al. .............. 235/375 |
| 2005/0051614 A1 * | 3/2005 | Albany ....................... 235/375 |
| 2005/0057801 A1 | 3/2005 | McWilliams |
| 2005/0099684 A1 * | 5/2005 | Mogamiya et al. ......... 359/426 |
| 2005/0179998 A1 * | 8/2005 | Studer et al. ............... 359/368 |
| 2005/0225854 A1 | 10/2005 | McWilliams |
| 2006/0085140 A1 * | 4/2006 | Feingold et al. ............. 702/23 |

FOREIGN PATENT DOCUMENTS

JP   2004 309867   11/2004

\* cited by examiner

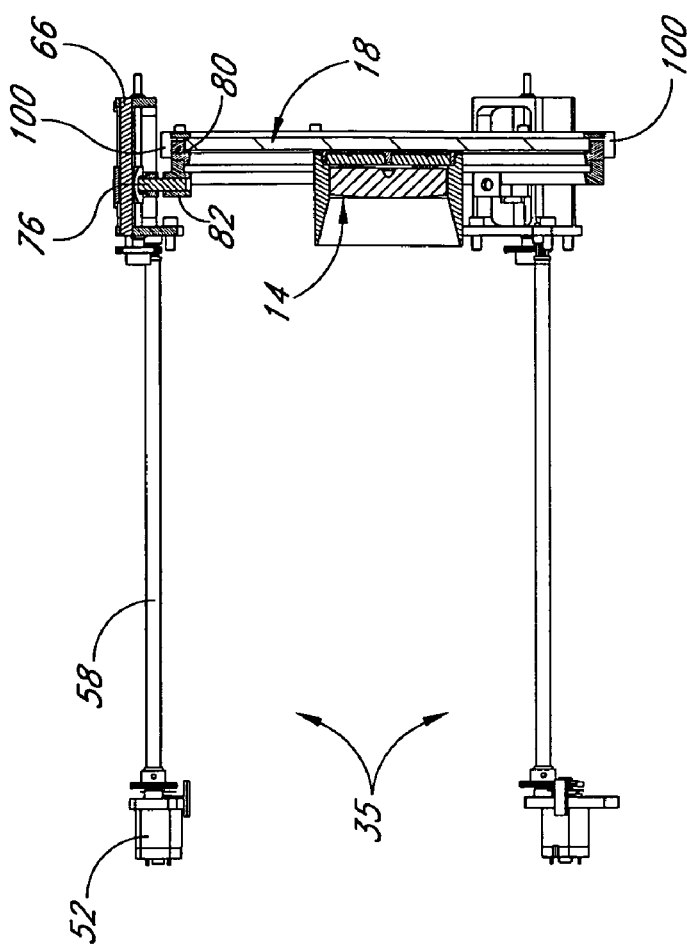
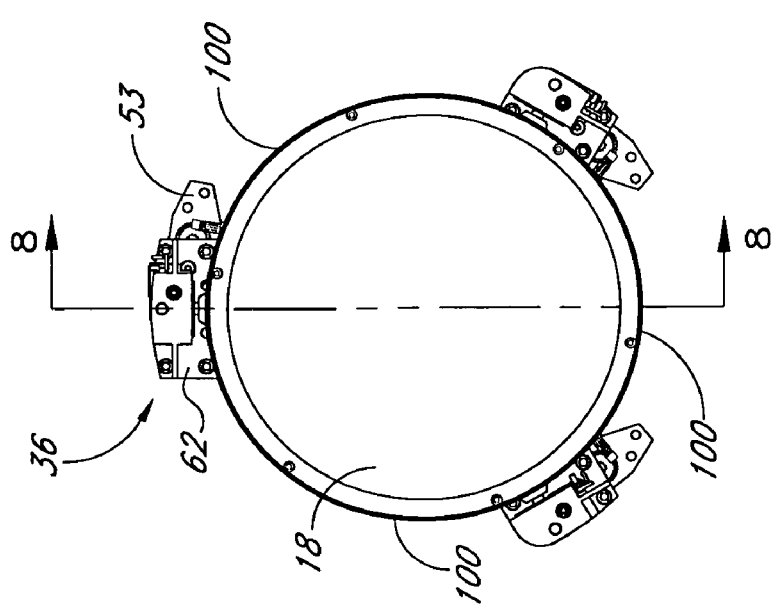
FIG. 8
FIG. 7

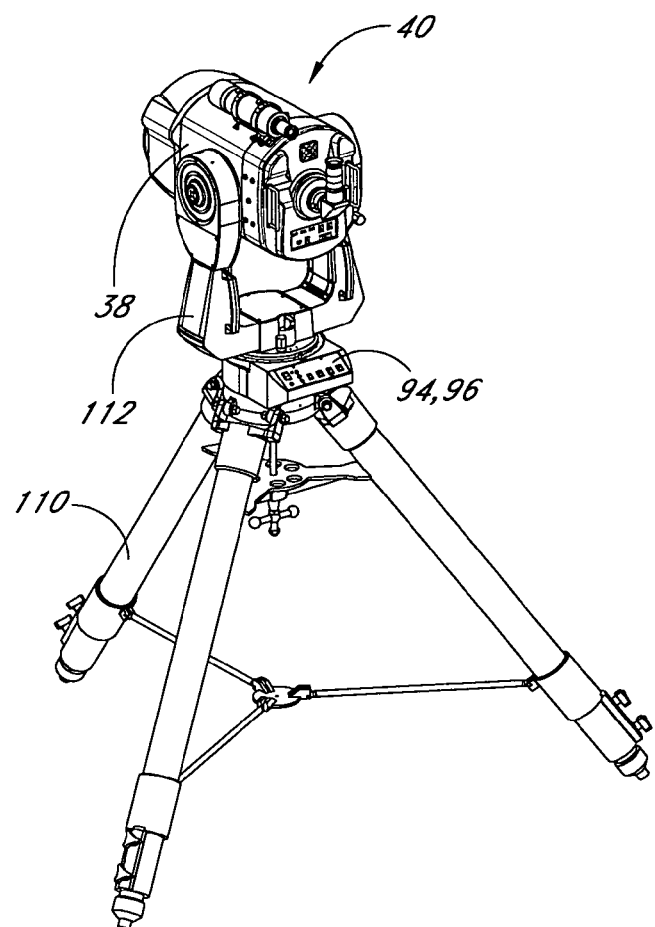
*FIG. 11*
 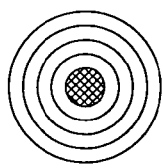 
*FIG. 12*   *FIG. 13*   *FIG. 14*

APPARATUS AND METHODS FOR FOCUSING AND COLLIMATING TELESCOPES

REFERENCE TO RELATED APPLICATIONS

The present application is a continuation-in-part of and claims priority benefit under 35 U.S.C. § 120 from U.S. patent application Ser. No. 10/899,221, filed Jul. 26, 2004, and entitled "APPARATUS AND METHODS FOR FOCUSING AND COLLIMATING TELESCOPES," which is hereby incorporated herein by reference in its entirety. The present application also claims the benefit of priority under 35 U.S.C. § 119(e) of U.S. Provisional Application No. 60/684,631 filed on May 25, 2005, and entitled "APPARATUS AND METHODS FOR FOCUSING AND COLLIMATING TELESCOPES," which is hereby incorporated herein by reference in its entirety.

BACKGROUND OF THE INVENTION

1. Field of the Invention

The present disclosure relates to the automated focusing and collimation of optical devices such as, for example, telescopes.

2. Description of the Related Art

Astronomy, and in particular, optical astronomy is increasingly popular, and advancements have been introduced in recent years to the instruments used for astronomical observation. High performance optical telescopes for the amateur and more advanced enthusiasts may include, for example, diffraction limited optical systems offering high resolving power as well as CCD cameras for recording vivid images. Such telescopes may have accurate computer controlled drive systems for positioning the telescope using databases of deep-sky objects, stars, objects in our solar system and even earth satellites. With such sophisticated equipment to assist the astronomer, astronomy can be wonderfully enjoyable while the images obtained can be impressive and awestriking.

Proper focusing and collimation are important for quality imaging. Telescopes are designed to collect substantially collimated light from distant objects in the sky and to focus the light onto a focal plane. In a Cassegrain telescope, light is collected by a large primary mirror and reflected toward a secondary mirror, which reflects the beam of light to the focal plane. (The primary mirror may alternatively be referred to herein as the primary, while the secondary mirror may alternatively be referred to herein as the secondary as is customary in the art.) The curved primary and secondary mirrors focus the beam onto the focal plane where an ocular or camera may receive the light for viewing or recording an image. The optical system, comprising the primary longitudinally displaced along an optical axis a distance from the secondary mirror, has an effective focal length, which is determined in part by this longitudinal separation. The longitudinal distance separating the primary and secondary may be adjusted to alter the location where the images come to focus. Conventional telescopes are focused by translating the primary mirror such that a sharp image is formed at the desired image plane.

Proper orientation of the mirrors with respect to the optical axis and to each other is also important for quality imaging. Misalignment in the form of tilt of the primary or secondary may result in image distortion.

SUMMARY OF THE INVENTION

Various non-limiting embodiments described herein also recognize that proper focusing and collimation often at least partially depend on the object being viewed; the eyesight of the particular user; the properties of a particular imager, eyepiece, filter, Barlow lens, or the like; combinations of the same or the like. Often, with each change in the foregoing optical elements, a user manually readjusts the telescope to achieve proper focusing and collimation to compensate for the change(s). Such readjustments can be burdensome and time-consuming, especially for novice users or when multiple users have repeated access to the same telescope. Accordingly, aspects of the present disclosure seek to automate some or all of the focusing and/or collimation adjustments through recognition of some or all of the foregoing optical elements or differing users.

In view of the foregoing, conventional optical devices, such as telescopes, do not provide straightforward methods or designs for automated focusing and collimation. Furthermore, conventional telescopes do not provide a straightforward way for adjusting the telescope based on auto-recognition of identification information associated with a user and/or devices being used with the telescope.

For purposes of summarizing the disclosure, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 7 is a front view of the corrector plate and actuators.

FIG. 8 is a cross-sectional view of the corrector plate and actuators taken along the line 8-8 in FIG. 7.

FIG. 11 is a schematic drawing of a telescope including a tripod and a fork assembly supporting a tube assembly and controller.

FIG. 12 is a schematic diagram of an image of a point source such as a star with a telescope that is sufficiently focused and collimated.

FIG. 13 is a schematic diagram of an image of a point source obtained with a telescope system that is out of focus.

FIG. 14 is a schematic diagram of a distorted image of a point source obtained with a telescope wherein the primary and secondary mirrors are misaligned.

DETAILED DESCRIPTION OF THE PREFERRED EMBODIMENTS

Figure 1:
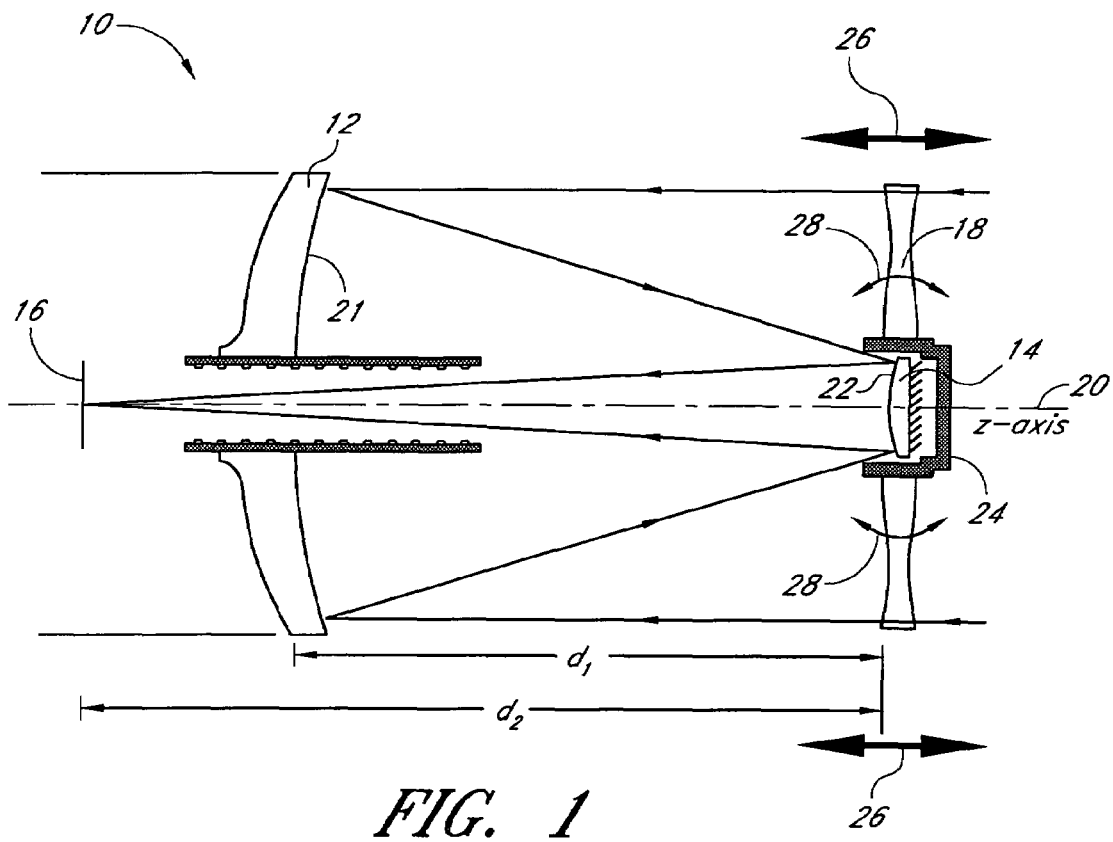
FIG. 1 is a schematic cross-sectional view of a Schmidt-Cassegrain telescope comprising a primary spherical mirror, a secondary mirror, and a corrector plate rigidly affixed to the secondary mirror.

Various non-limiting embodiments described herein include but are not limited to telescopes and apparatus and methods for focusing and collimating telescopes. One embodiment of the invention, for example, comprises a catadioptric telescope. This catadioptric telescope includes a tube assembly having a front cell and a rear cell. This tube assembly comprises a hollow telescope tube with proximal and distal ends. The rear cell is at the proximal end of the telescope and the front cell is at the distal end of the telescope tube. A primary mirror is disposed in the rear cell of the tube assembly. A corrector cell is distal to the front cell of the tube assembly. The corrector cell houses a corrector plate. A secondary mirror is centrally located with respect to and affixed to the corrector plate in the corrector cell. At least one electrically driven actuator is mounted to the front cell and the corrector cell so as to mechanically connect the corrector cell to the front cell. The actuator is movable in a controllable manner such that the corrector cell may be moved with respect to the front cell of the tube assembly and the corrector plate and secondary mirror can be moved with respect to the primary mirror. IN certain embodiments, control electronics are electrically connected to the electrically driven actuator. The control electronics have an output that provides signals to the electrically driven actuator to control movement of the actuator.

Another embodiment of the invention comprises a method of focusing a catadioptric telescope comprising a primary mirror, a secondary mirror, and a corrector, wherein the secondary mirror is affixed to the corrector. The method comprises monitoring feedback indicative of image focus for the catadioptric telescope and manipulating the corrector with one or more actuators mechanically connected to the corrector based on the feedback indicative of the image focus. The secondary mirror moves with the corrector so as to improve the focus of the telescope.

Another embodiment of the invention comprises a method of collimating a catadioptric telescope comprising a primary mirror, a secondary mirror, and a substantially optically transmissive optical element, wherein the secondary mirror is affixed to the substantially optically transmissive optical element. The method comprises (i) monitoring feedback indicative of the state of collimation of the catadioptric telescope and (ii) manipulating the substantially optically transmissive optical element with at least one actuator mechanically connected to the substantially optically transmissive optical element based on the feedback indicative of the state of collimation. The secondary mirror moves with the substantially optically transmissive optical element so as to improve collimation of the telescope.

Another embodiment of the invention comprises a catadioptric telescope comprising a primary mirror, a substantially optically transmissive optical element, and a secondary mirror. The primary mirror and the substantially optically transmissive optical element are disposed along an optical path through which light entering the telescope may propagate. The secondary mirror is affixed to the substantially optically transmissive optical element. The optical path continues onto the secondary mirror from the primary mirror. The catadioptric telescope further comprises a supporting structure for supporting the primary mirror and substantially optically transmissive optical element and one or more actuators are movable such that the substantially optically transmissive optical element and secondary mirror affixed thereto may be moved with respect to the primary mirror. The actuators comprise an electromechanical driver having electrical inputs and a rotatable threaded shaft connected to the electromechanical driver. The electromechanical driver rotates the threaded shaft with application of electrical power to the electrical inputs. A threaded coupler is threadedly connected to the rotatable threaded shaft such that the threaded fastener moves in a longitudinal direction along the rotatable threaded shaft when the shaft rotates. At least a portion of the substantially optically transmissive optical element can be translated when the rotatable threaded shaft is rotated by the electromechanical driver.

Another embodiment of the invention comprises a catadioptric telescope comprising a primary mirror, a secondary mirror, and a tube assembly. The tube assembly comprises sidewalls that form a hollow inner region and has an optical aperture through which light enters the hollow central region. The catadioptric telescope further comprises at least one electrically driven actuator disposed at the sidewalls of the tube assembly and connected to the secondary mirror such that the secondary mirror may be moved with respect to the primary mirror. Control electronics having an output provide signals to the electrically driven actuator to control movement of the actuator.

Another embodiment of the invention comprises a catadioptric telescope comprising a primary mirror, a secondary mirror, and a tube assembly. The tube assembly comprises sidewalls that form a hollow inner region and has an optical aperture through which light enters the hollow central region. This optical aperture is no more than about 12 inches across. The catadioptric telescope further comprises at least one actuator disposed with respect to the secondary mirror such that the actuator may move the secondary mirror with respect to the primary mirror.

Another embodiment of the invention comprises a method of focusing a catadioptric telescope comprising a primary mirror, a secondary mirror, and a corrector wherein the secondary mirror is affixed to the corrector. In this method, positioning data is retrieved from a record. The positioning data relates to the position of the corrector. The corrector is manipulated with at least one electrically driving actuator mechanically connected to the corrector based on the retrieved positioning data. The secondary mirror moves with the corrector to alter focus.

Another embodiment of the invention comprises a catadioptric telescope comprising a telescope tube, a primary mirror, and a corrector. The corrector and the primary mirror are disposed along an optical path through the telescope tube. At least one connector connects the corrector to the telescope tube. The corrector is separated from the telescope tube by substantially thermally insulating regions. A secondary mirror is affixed to the corrector. The optical path continues to the secondary mirror from the primary mirror. A source of heat is disposed with respect to the corrector to heat the corrector. The substantially thermally insulating regions reduce thermal conduction of the heat from the corrector to the telescope tube.

To facilitate a more complete understanding of various embodiments of the disclosure, features of their systems and methods will now be described with reference to the drawings summarized above. The drawings, associated descriptions, and specific implementation are provided to illustrate embodiments of the invention and not to limit the scope of the disclosure.

FIG. 1 depicts a telescope 10 comprising a primary mirror 12, a secondary mirror 14, and focal plane 16. The telescope 10 further comprises a refracting corrector plate 18. The primary 12, secondary 14, and corrector 18 are aligned about an optical axis 20 centrally located through the telescope 10. This optical axis 20 is designated the z-axis in FIG. 1 and has orthogonal x- and y-axes. The primary mirror 12 may have, for example, a metallized parabolic reflecting surface 21, although an artisan will recognize from the disclosure herein that the reflecting surface may have other shapes such as spherical, aspherical or the like. The primary mirror 12 may comprise glass or Pyrex that is polished or shaped to form the curved reflecting surface 21. The secondary mirror 14 also has a curved reflecting surface 22. Like the primary 12, the secondary mirror 14 may also comprise glass and may be polished and metallized to form the curved reflecting surface 22. Other materials can be used for the primary and secondary mirrors 14, 18.

The refractive corrector plate 18 is preferably a substantially transmissive optical element comprising for example glass or other materials. The corrector plate 18 preferably has at least one, and possibly two shaped surfaces, which may be aspheric. The corrector plate 18, however, preferably has negligible optical power.

This telescope 10, having both reflective and refractive optical elements, is a catadioptric telescope. This particular configuration, which includes the combination of the primary and secondary mirrors 12, 14 and corrector plate 18, may be referred to as a Schmidt-Cassegrain. The curvature of the corrector plate 18 is different and distinct from that of the secondary mirror 14. Preferably, however, the secondary mirror 14 is rigidly affixed to the corrector plate 18 such that the two optical elements are connected together. FIG. 1 shows a baffle 24 between the corrector 18 and the secondary 14, however, preferably the corrector is attached to the secondary mirror through the baffle or other structure that secures the corrector and the secondary together.

In various preferred embodiments of the present invention, the secondary mirror 14 can be moved to focus and collimate the telescope 10. The secondary 14 can be translated longitudinally along the longitudinal (z-axis), toward or away from the primary 12 to focus. The secondary 14 preferably can also be tilted in different directions to collimate. For example, the secondary 14 may be tilted about the orthogonal x- or y-axes or other axes orthogonal to optical axis 20. The secondary 14 may be tilted about a center located on the optical axis (z-axis) or about off-axis centers as well. Other orientations for the secondary mirror 14 may be possible as well.

In preferred configurations where the secondary mirror 14 is affixed to the corrector plate 18, the corrector plate 18 may be translated or tilted to effectuate the desired longitudinal displacement or tilt of the secondary mirror 14. One or more actuators, for example, may be affixed to the corrector plate 18 to execute such movements. In various preferred embodiments, these actuators are at the perimeter of the corrector plate 18 and manipulate the corrector plate from its perimeter.

As shown, collimated rays from, for example, a celestial object, are received by the telescope 10. Preferably, the collimated rays pass through the corrector plate 18 without being substantially deviated such that movement of the corrector plate would interfere with quality imaging. In other embodiments discussed more fully below, the secondary may be affixed to a substantially optically transmissive plate such as an optical flat or window or is supported by a support structure such as vanes. Accordingly, the angle of the light may therefore not be altered by refraction. The collimated light propagates to the primary mirror 12 where the curved concave reflecting surface 21 converts the collimated beam into a converging beam directed toward the secondary mirror 14. The converging beam reflects off the convex curved reflecting surface 22 of the secondary mirror 14. The beam continues to converge toward the focal plane 16 where the beam is focused.

An image of the object is formed at this focal plane 16. Accordingly, an optoelectronic imaging device such as a CMOS or CCD camera can be disposed at, near, or with respect to the focal plane 16 to record an image of the object. Alternatively, an ocular can be positioned relative to the focal plane 16 to permit viewing of the image with the eye. In other configurations, optics or optical instruments, such as for example a spectrometer, can be suitably located with respect to the focal plane 16 to receive the light from the distant object.

The location where the image comes to focus is determined by the focal length of the telescope 10 and the location of the primary and secondary mirrors 12, 14. The focal length of the telescope 10 depends on the power of the primary and secondary mirrors 12, 14 and the longitudinal distance separating the primary from the secondary, which is shown in FIG. 1 as $d_1$. Longitudinally displacing the secondary mirror 14 in relation to the primary mirror 12, which increases or decreases $d_1$, therefore, shifts the focal plane of the telescope 10. Accordingly, by adjusting the separation of the primary and secondary mirror 12, 14, the focus of the image may be altered. Additionally, presuming that the focal length were held fixed, translation of the mirrors causes the focal plane, (shown in FIG. 1 to be distance $d_2$ from the secondary) to be displaced longitudinally as well. Accordingly, the secondary mirror 14 can be translated in a direction parallel to the longitudinal axis (z-axis) thereby shifting the location of the focal plane 16 with respect to, for example, a camera, ocular, or other optics. For these reasons, the telescope 10 can be focused by translating the secondary mirror 14 along the longitudinal axis.

The telescope 10 may also be collimated by moving the secondary 14 to improve the image quality. If the primary 12 and/or the secondary 14 are misaligned, e.g., tilted with respect to the optical axis 20, each other, or the focal plane 16, the image may be distorted. The telescope 10 is said to need collimation or alignment. The secondary mirror 14 may be tilted to correct this distortion. Accordingly, adjustment of the orientation of the secondary mirror 14 can therefore be adjusted to collimate the beam and enhance the clarity of the image.

FIG. 1 shows arrows 26, 28 schematically depicting possible movement of the corrector plate 18 and the secondary mirror 14, for example, in the longitudinal direction or tilting of the corrector plate and secondary mirror. In various preferred embodiments, the secondary mirror 14 is attached to the corrector 18 such that translation or canting of the corrector 18 displaces or reorients the secondary mirror in a similar manner. Accordingly, actuators configured to move the corrector plate 18 may, consequently, alter the position of the secondary 14 and thus focus the telescope 10 or change attitude of the secondary 14 and collimate the telescope.

Figure 2:
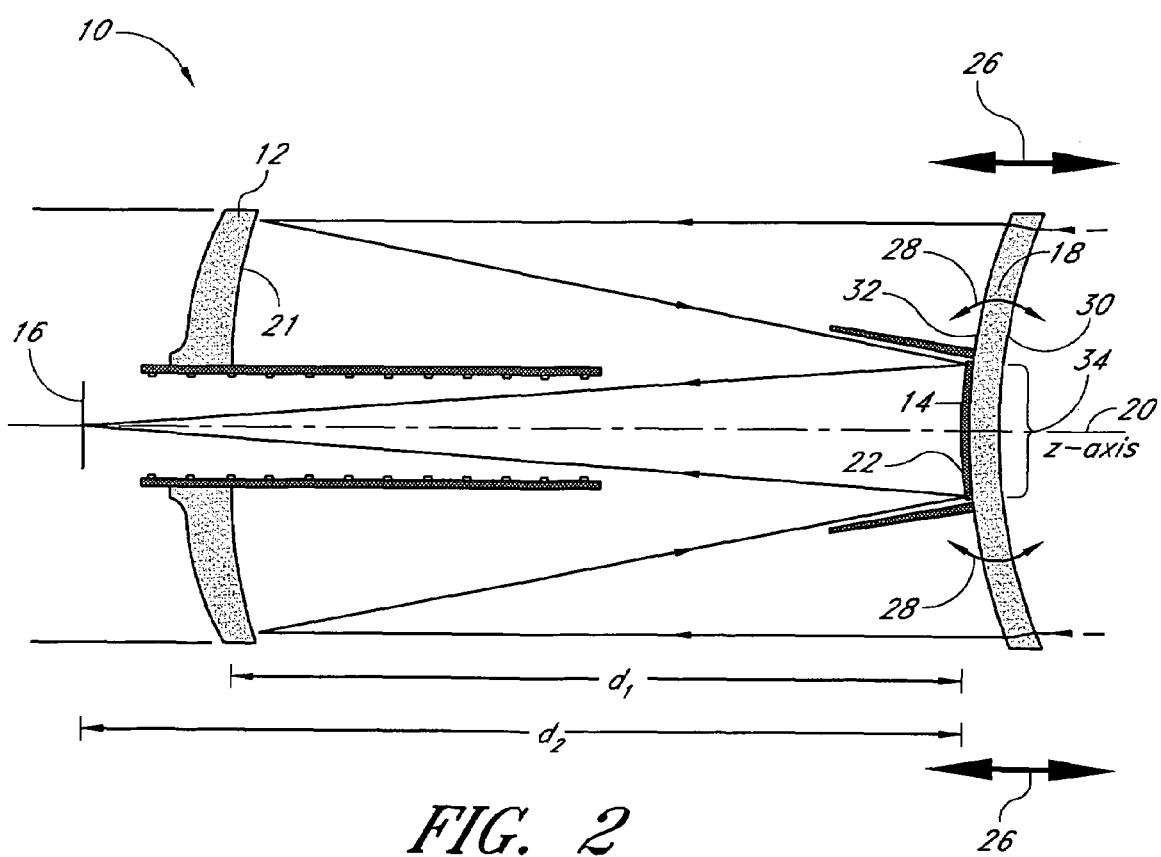
FIG. 2 is a schematic cross-sectional view of a Maksutov-Cassegrain telescope comprising a primary mirror, a secondary mirror, and a corrector plate wherein the secondary mirror comprises a reflecting surface formed on the corrector plate.

Another telescope design, known as a Maksutov-Cassegrain telescope, is shown in FIG. 2. In this catadioptric telescope 10, the secondary mirror 14 forms part of the corrector 18. In particular, the corrector 18 comprises a curved refractive optical element having forward and rearward surfaces 30, 32. The forward surface 30 is directed toward the object and the rearward surface 32 faces the primary 12. The corrector plate 18 depicted in FIG. 2 is substantially optically transmissive with the exception of a central region 34 thereof. The forward and rearward surface 30, 32 of the corrector 18 are concave transmissive surfaces to light propagating from a celestial object through the corrector 18 and to the primary mirror 12. In various preferred embodiments, the central portion 34 of the rearward surface 32 is metallized to form a substantially reflective surface corresponding to the secondary mirror 14. Other reflective coatings may also be employed as well. As a result of the shape of the corrector 18, the secondary mirror surface is convex. Also, since the secondary mirror 14 is formed on a surface 32 of the corrector lens 18, adjusting the position and orientation of the corrector such as for example schematically represented by arrows 26, 28 causes similar movement of the secondary reflector 14. Accordingly, the corrector 18 can be displaced longitudinally along the optical axis 20 to impart the desired translational motion to focus the telescope 10. Additionally, the corrector 18 can be tilted to introduce the desired amount of tilt in the secondary 14 to collimate the telescope 10. Focus and collimation of the telescope 10 can thus be accomplished by establishing the appropriate position and orientation, respectively, of the secondary mirror 14.

The specific optical designs and configurations of the telescope 10 should not be limited to those specifically described with reference to FIGS. 1 and 2. For example, the primary 12, secondary 14, and corrector 18 may have spherical or aspheric surfaces. These optical elements 12, 14, 18 may comprise glass, Pyrex, or other transmissive or non-transmissive materials. The reflective surfaces may be formed by metallization. Reflecting coatings of other types may be used as well. In different embodiments of the invention, reflective surfaces or structures may be otherwise created. The telescope 10 may include additional components such as baffles, stops, reflectors, lenses, polarizers, filters, holographic or diffractive optical elements and other optical elements. The telescope 10 may further comprise an ocular, a photographic or optoelectronic camera, optical instruments, as well as other subsystems, devices, and accessories.

In some preferred embodiments, the secondary 14 is connected to an optical element such as for example a substantially optically transmissive plate (e.g. glass plate or optical flat) instead of a corrector 18. Such an optical element may or may not have one or more curved surfaces and may or may not have optical power. The optical element (e.g., optical plate, lens, or the like) may be moved in a manner discussed above to manipulate the position and orientation of the corrector 18. This optical element may be moved by one or more actuators 36 peripheral to the optical element. As with the corrector 18 plate, light would pass through the substantially optical element to the primary and secondary mirrors.

In other embodiments, the corrector 18 is replaced with a support structure such as one or more vanes secured to the secondary. The support structure may be moved by one or more actuators 36 to alter the position and/or orientation of the secondary mirror 14. These actuators 36 are preferably disposed in peripheral areas of the support structure so as to reduce obstruction of light that would otherwise propagate through the telescope 10 to the primary 12. Similarly, in the case where one or more vanes is employed to support the secondary mirror 14, the vanes are preferably substantially thin with respect to the aperture of the telescope 10 such that the vanes do not prevent a substantial portion that would otherwise reach the primary mirror 12. Alternatively, the vanes or supports may be substantially optically transmissive.

Figure 3:
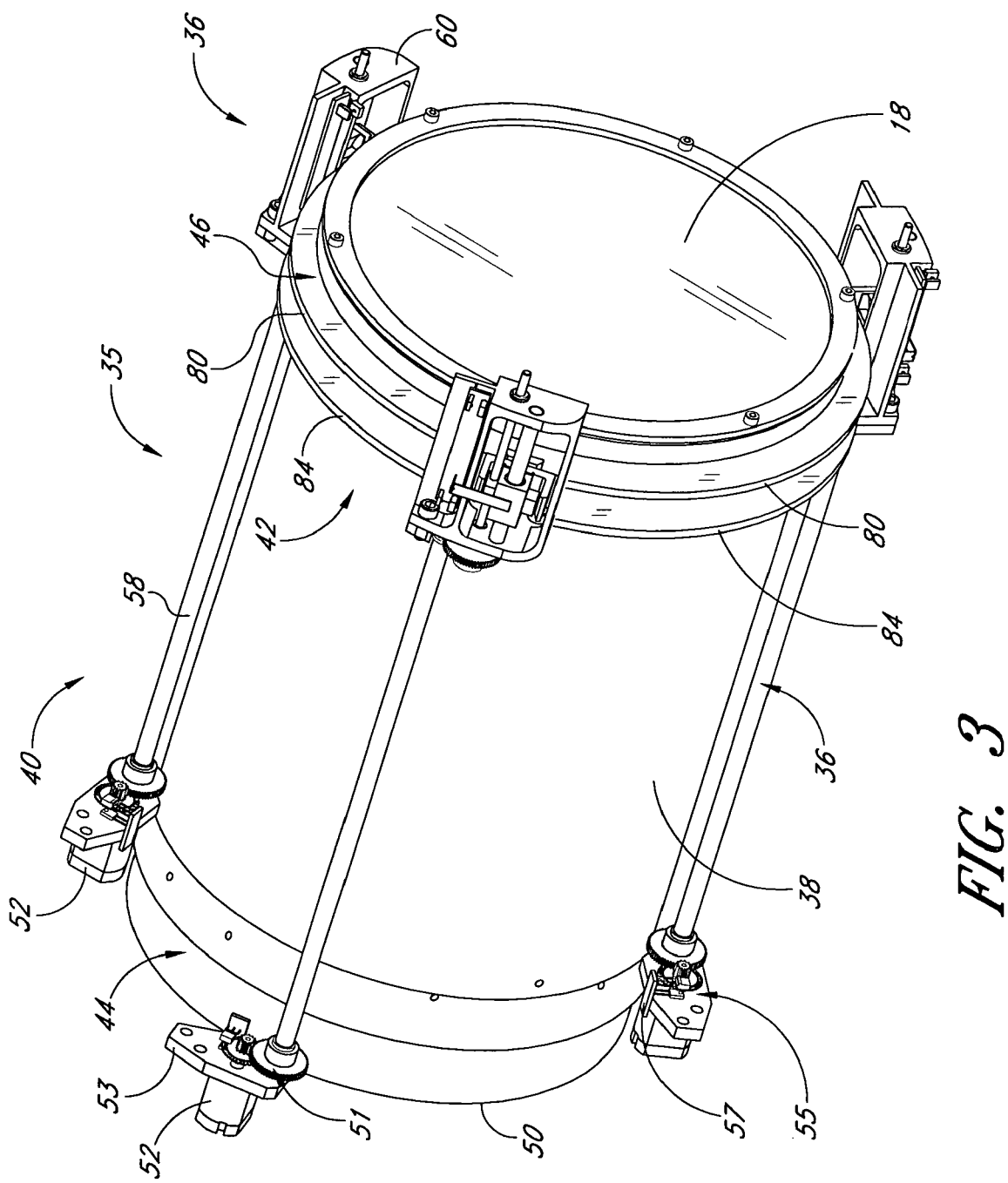
FIG. 3 is a perspective view of a catadioptric telescope comprising actuators for moving the corrector plate and secondary mirror for use in focusing and collimating the telescope.
Figure 5:
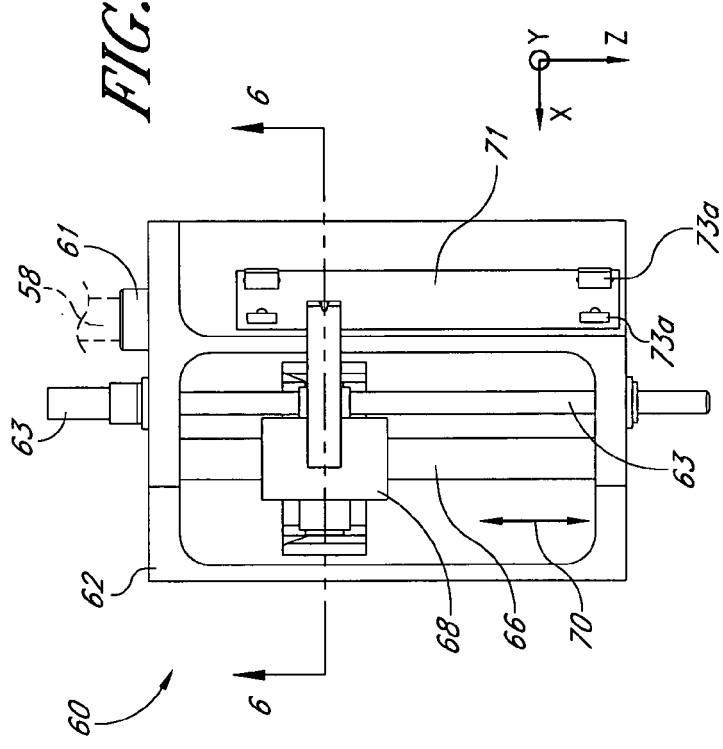
FIG. 5 is a close-up top view of one of the actuators shown in FIG. 3.
Figure 4:
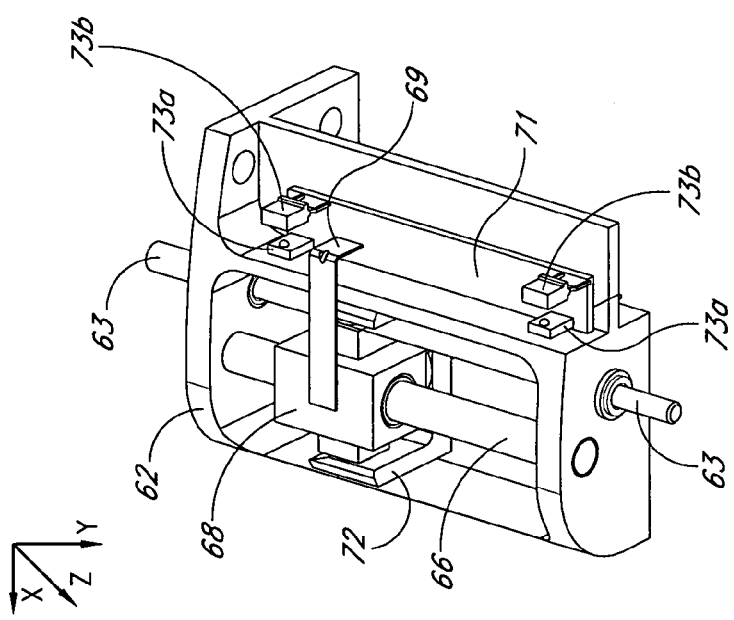
FIG. 4 is a close-up perspective view of one of the actuators shown in FIG. 3.

An embodiment of the telescope 10 comprising a focusing/collimation assembly 35, which comprises a plurality of actuators 36 for manipulating the corrector plate 18, is illustrated in FIG. 3. The telescope 10 shown in FIG. 3 includes three such actuators 36. Close-up perspective and top views of a portion of the actuators 36 is depicted in FIGS. 4 and 5. A cross-sectional view through one of the actuators 36 is presented in FIG. 6. A front view of the telescope 10 and a cross-section through the focusing/collimation assembly 35 and secondary mirror 14 and corrector plate 18 is shown in FIGS. 7 and 8.

As shown in FIG. 3, the telescope 10 comprises a tube 38 that forms part of a tube assembly 40 for housing the primary mirror 12, secondary mirror 14, and corrector 18. The tube 38 has a front (or distal end) and a rear (or proximal end) designated the front cell 42 and the rear cell 44. The distal end of the tube 38 may be directed toward a celestial object to be viewed.

A corrector cell 46 is forward of the front cell 42 and houses the corrector plate 18. A space may separate the corrector cell 46 from the front cell 42 of the tube 38 (not shown). This space may be covered by a flexible skirt (not shown) comprising for example rubber, cloth, plastic, synthetic fabric, or other material for blocking light and dust and/or the like from entry into the tube assembly 40. The secondary mirror 14 (see FIG. 8) is located at the center of the corrector plate 18. The primary mirror 12 is disposed at the rear cell 44. The rearward portion of the tube assembly 40 is essentially closed-off by a cell back 50 affixed to the rear cell 44. Photographic and optoelectronic cameras as well as other components and accessories can be connected to this cell back 50 in various embodiments. Preferably, the primary mirror 12 is firmly secured in the rear cell 44 using for example cement, glue, epoxy, silicone couching or other material to adhered the primary mirror to the cell back 50. The primary 12 may otherwise be connected, for example, to the tube assembly 40 or other rigid framework that preferably serves as a platform for the telescope optics. Fasteners or other devices for fixing the primary mirror 12 in place may be used as well. Rigidly securing the primary mirror 12 in place reduces misalignment and shifts due, for example, to vibration that may be introduced during focusing or collimation. Preferably, the primary mirror 12 will not become inadvertently tipped, tilted, or displaced, and thereby misaligned. In other embodiments, the primary mirror 12 may have a position and orientation that is adjustable, however, the primary is preferably rigidly affixed in place in various preferred embodiments.

As shown in FIG. 7, three actuators 36 may be employed and these actuators 36 may be disposed about a circular perimeter of the telescope 10 centered about the optical axis 20 through the telescope. In various preferred embodiments, these actuators 36 are separated azimuthally by about 120 degrees about the optical axis 20 although the positions and respective azimuthal angles separating the actuators may vary and should not be limited.

In the embodiments depicted in FIGS. 3-8, each of the actuators 36 includes an electrical motor 52 in the proximity of the rear cell 44 of the telescope tube 38. The motor 52 is shown mounted to a mounting bracket 53. Preferably, this mounting bracket 53 is mounted to the tube assembly 40 or the motor is otherwise secured in place. A rotatable shaft extends from the motor 52 and rotates when the motor is activated.

In these embodiments, the actuators 36 further comprises a drive shaft 58 and a drive box assembly 60. The drive shaft 58 has a proximal end connected to the rotating motor shaft via drive gears 51 such that rotation of the motor shaft induces corresponding rotation of the drive shaft. In these embodiments, the actuator 36 further comprises an encoder 55 to track rotation of the motor 52. Preferably, this encoder 55 outputs a precise measure of the angular position of the rotating motor shaft and the drive shaft 58. A position sensor board 57 preferably includes electronics that outputs electrical signals from the encoder 55 based on the position of the rotatable motor shaft and drive shaft 58. These electrical signals may be communicated to control electronics as discussed more fully below.

As shown in FIG. 5, the drive shaft 58 has a distal end connected to a drive shaft bushing 61 on the drive box assembly 60. FIG. 5 depicts this drive shaft 58 in phantom. The drive box assembly 60 comprises a frame 62 that supports a threaded drive screw 63 which is rotatable. The drive shaft bushing 61 is connected to the threaded drive screw 63 through drive gears such that rotation of the drive shaft 58 and consequent rotation of the drive shaft bushing 61 causes rotation of the drive screw 63. The drive box frame 62 supports a guide pin 66 that extends a substantially parallel to the drive screw 63. The guide pin 66 passes through a coupler 68, which rides on the guide pin. An opening through coupler 68, through which the guide pin 66 passes, permits movement of the coupler in a longitudinal direction along the guide pin. The coupler 68 further comprises a threaded opening through which the threaded drive screw 63 passes. Rotation of the threaded drive screw 63 causes the coupler 68 to be longitudinally translated along the guide pin 66 in a direction parallel to the guide pin and the threaded drive screw as indicated by arrows 70. This direction is parallel to the z-axis shown in FIGS. 4-6. The drive box assembly 60 may further include a position sensing device comprising a position indicator 69 and a limit sensor board 71 having a pair of emitters 73a and detectors 73b for position sensing. This position sensing device together with the encoder 55 may enable precise tracking of the movement introduced by the actuator 36.

Figure 6:
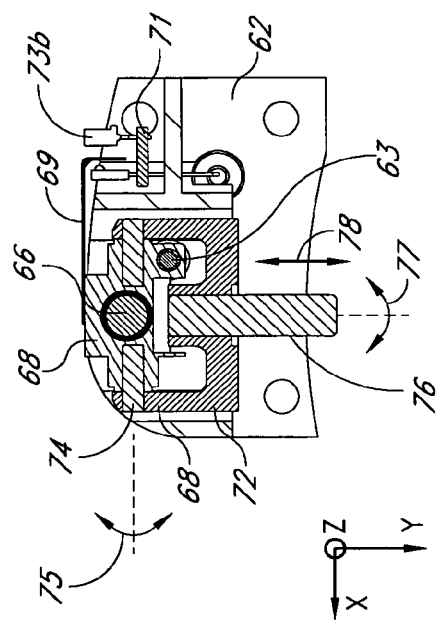
FIG. 6 is a cross-sectional view along the line 6-6 of the actuator shown in FIG. 5 depicting the drive box assembly used to move the corrector plate and secondary mirror.

The coupler 68 is pivotably connect to a swivel yoke 72 by a pair of nut pins 74 that fit into opening in the coupler. These nut pins 74 screw into the swivel yoke 72, extending through the swivel yoke to the coupler 68. The pair of nut pins 74 establish pivot points that permit the swivel yoke 72 to rotate with respect to the coupler 68. In particular, the swivel yoke 72 may rotate about an axis through the nut pins 74 parallel to the x-axis shown in FIGS. 4-6. This angular motion is schematically illustrated in FIG. 6 by arrows 75.

One end of a swivel pin 76 fits in a cylindrical opening in the swivel yoke 72. Another end of the swivel pin 76 fits into another cylindrical opening in a swivel pin block 82 (see FIG. 8). This swivel pin 76 preferably permits movement of the swivel yoke 72 about an axis through the swivel pin parallel to the y-axis shown in FIGS. 4-6. This angular motion is schematically illustrated in FIG. 6 by arrows 77. Accordingly, the swivel pin 76 and the swivel pin block 82 can rotate with respect to the swivel yoke 72. The swivel pin 76 also preferably can move in a longitudinal direction parallel to the y-axis in FIGS. 4-6 as well. This axial motion is indicated by arrows 78 in FIG. 6. The swivel pin 76 can therefore preferably move in inward and outward directions with respect the opening in the swivel pin block 82 in which the swivel pin fits. The swivel yolk 72 and the swivel pin block 82 may thus have increased or reduced separation therebetween. The swivel pin block 82 is molded to a corrector cell plate 80 shown in FIGS. 3 and 8 and is thereby firmly secured to the corrector cell 46 and the corrector optic 18. The actuator 36 is thus mechanically linked to the corrector cell 46, the corrector 18, and the secondary mirror 14.

The actuator 36 is also mechanically connected to the front cell 42 of the telescope 10. In this embodiment, the frame 62 of the drive box assembly 60 is mounted to a drive assembly mounting plate 84 (shown in FIG. 3) that is firmly secured to the telescope tube 38. In the embodiment shown, the drive assembly mounting plate 84 comprises a ring-shaped or annular plate having an inner diameter substantially matched to the telescope tube 38. The drive assembly mounting plate 84 may support each of the drive box assembly units 60 for the three actuators 36 and thus form a physical connection to all three actuators.

Accordingly, the actuator 36 can be activated to re-position the secondary mirror 14. The motor shaft may be rotated in a controlled manner based on signals applied to the motor 52. Rotation of the motor shaft causes similar rotation of the drive shaft 58 and the threaded drive screw 63. The coupler 68 through which the drive screw 63 is threadedly connected, is translated with respect to the drive screw and the drive box assembly 60 as a result of the rotating drive screw. Displacement of the coupler 68 causes the swivel yoke 72, the swivel pin 76, and the swivel pin block 82 to be shifted and tilted with respect to the drive screw 63 and drive box assembly frame 62. Likewise the portion of the corrector cell 46 attached to the swivel pin block 82 via the corrector cell plate 80 is shifted with respect the front cell 42. The front cell 42 is also connected to the drive box assembly 60 through the drive assembly mounting plate 84. Shifting of this portion of the corrector cell 46 and similarly the corrector plate 18 may cause the corrector plate and the secondary mirror 14 to be tilted with respect to the telescope tube 38 and the primary mirror 12.

Activation of any single one or any combination of the actuators 36 together may be used to shift and/or tilt or tip the secondary mirror 14 as desired. For example, translation of each of the actuators 36 by equal amounts may in certain circumstances cause longitudinal displacement of the corrector cell 46 and secondary mirror 14 parallel to the optical axis 20. Shifting the corrector cell plate 80 by different amounts at the different actuator locations may cause the secondary mirror 14 to be tilted or tipped and may or may not include longitudinal displacement of the secondary toward or away from the primary mirror 12.

Preferably the encoder 55 and the position sensing device in the drive box assembly units 60 permit the movement and position to be precisely monitored. Signals from the encoder 55 and position sensing device in the drive box 60 can be used to determine location and to thereby adjust the corrector 18 and secondary 14 in a controlled manner. Other types of position sensing and monitoring devices may be employed in other embodiments. In some embodiments, such position/movement sensors may be excluded.

Advantageously, the actuators 36 are configured to prevent binding and possible seizure. As the actuators 36 are used to tip and tilt the corrector cell 46, the orientation of the corrector cell may vary causing varyingly directed forces to be applied to the actuators. Preferably, the actuator 36 is designed to accommodate the movement of the corrector cell 46 and to avoid binding that may result from tension on the components of the actuator. For example, the pair of nut pins 74 permit swivel of the swivel yoke 72 with respect to the drive screw 63 and drive box assembly 60. This motion is represented by the arrow 75 in FIG. 6. Upon rotation of the drive screw 63 and consequent translation of the coupler 68, the angle of the swivel yoke 72 with respect to the swivel nut pins 74 and drive screw is thus free to change. In addition, the swivel yoke 72 may rotate about the swivel pin 76 and with respect to the swivel pin block 82. This angular motion is schematically represented by the arrow 77 in FIG. 6. Accordingly, if an adjacent actuator 36 is activated to tilt the corrector 18 and secondary mirror 14, the corrector cell 46 may tilt causing the swivel pin block 82 to rotate with respect to the swivel yoke 72. Binding and seizure can therefore be avoided when the corrector cell 46 is so tilted. The swivel yoke 72 may also be moved closer or farther from the swivel pin block 82 depending on the attitude of the corrector cell 46 with respect to the front cell 42 and the actuators 36. Advantageously, the swivel pin 76 fits into openings in the swivel yoke 72 and the swivel pin block 82 and is able to move longitudinally along a direction parallel to the pin's length. As a result, the swivel yoke 72 is able to move with respect to the swivel pin block 82. The longitudinal movement of the swivel yoke 72 with respect to the swivel pin block 82 is schematically represented by the arrow 78 in FIG. 6.

The actuators 36 depicted in FIGS. 3-6 represent various non-limiting embodiments of devices for manipulating the secondary mirror 14 and should not be construed as limiting. Other structures and designs may be used in other embodiments of the invention.

Although three actuators are shown in FIG. 3, more or less actuators may be employed. For example, one or more actuators may be used to focus the telescope 10. Two or more actuators may be used to collimate the telescope 10. Also, although a corrector 18 is shown, the secondary 14 may otherwise be supported by, e.g., an optical element such as a lens, an optical flat, or an optical plate that is not a corrector. One or more vanes or support beams or by other types of support structures may also be employed. The secondary 14 likewise may be manipulated by movements of these support structures. Preferably, the secondary 14 is manipulated by movement of actuators 36 disposed about the optical path where light propagates to the primary mirror 12 so as to reduce obstructions to light throughput to the primary mirror. For example, the telescope tube 38 may comprise sidewalls surrounding an inner region through which light passes to the primary 12. The actuators 36 may be disposed at these sidewalls. In various preferred embodiments, the actuators 36 are disposed outside these sidewalls such that the secondary mirror 14 is moved from beyond the inner region of the telescope 10 where light propagates to the primary 12 thereby reducing obstructions. Accordingly, the actuators 36 may be connected to the perimeter of the corrector 18 or other optical plate or at locations on the vanes or other support structures remote from the secondary 14. By placing the actuators 36 a distance from the secondary 14 and outside or at least less in the optical path of the light to the primary 12, more light may be collected by the primary.

Figure 9A:
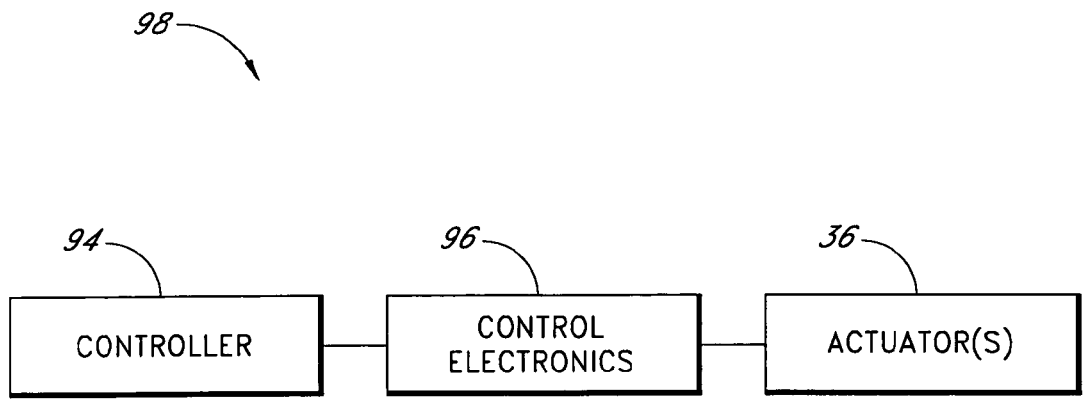
FIG. 9A is a block diagram schematically illustrating one embodiment of a control system comprising control electronics for controlling motion of the actuators.

A controller 94 such as shown in a block diagram format in FIG. 9A may assist the user in focusing and collimating the telescope 10. In one preferred embodiment, the controller 94 is electrically connected to control electronics 96 as schematically illustrated in FIG. 9A. The controller 94, the control electronics 96, and the actuators 36 may together form a control system 98 as shown by the block diagram. The controller 94 may act as the user interface through which a user issues instructions for manipulating and/or adjusting the telescope 10. The controller 94 may, for example, include a display for presenting information to the user and a keypad through which the user inputs instructions or data. For instance, to focus the telescope 10 the user can translate the corrector 18 and secondary mirror 14 toward or away from the primary mirror 12 by depressing these keys as will be discussed more fully below. The controller 94 may also include keys for specifying tilt or tip of the secondary 14 and corrector 18 to enable collimation. Although in some embodiments these keys may comprise buttons disposed on the controller 94, other touch sensitive surfaces may be employed as well. Various other configurations are also possible.

The control electronics 96 are preferably configured to receive signals output by the controller 94 and to drive the actuators 36 according to commands specified by the user. The control electronics 96 may comprise, for example, a computer or microprocessor or other electronics for processing signals from the controller 94. The control electronics 96 are preferably electrically connected to the actuators 36 and in particular to the motors 52 in the actuators. In one preferred embodiment, the control electronics 96 comprise digital electronics for sending control signals to the motors 52 in the actuators 36, which may comprise, for example, D.C. servos, stepper motors, combinations of the same or the like. In various preferred embodiments, the control electronics 96 comprise logic circuitry for converting instructions specified by the user with the controller 94 into the appropriate control signals for controlling the motors 52 and actuators 36 so as to fulfill the user's commands. For example, translating the secondary mirror 14, toward or away from the primary mirror 12 may involve movement of all three actuators 36 in the embodiment shown in FIG. 7. Tilting or tipping the secondary mirror 14 may comprise suitable movement of one of the actuators 36 or a combination of the actuators. Preferably, the control electronics 96 comprise the logic to determine the appropriate actuator 36 movement to effectuate the commands specified by the user. In a three point system such as shown in FIG. 7, for instance, the controller 96 preferably can cause the actuators to tip, tilt or translate the secondary 14 appropriately. For example, when focusing, the control electronics 96 preferably is capable of moving the actuators 36 in a suitable manner to introduce longitudinal displacement of the secondary mirror 14 while maintaining the secondary mirror properly centered and properly oriented. Additionally, when the secondary 14 is tipped and/or tilted during collimation, the secondary mirror also preferably remains focused. As discussed more fully below, the telescope assembly 40 may be reoriented (e.g., rotated and canted) to track the celestial object used to collimate and focus the telescope.

The control electronics 96 may also include logic to implement additional processes and features. For example, the process of focusing or collimating the telescope 10 may be automated. An image obtained by an opto-electronic camera such as a CCD or CMOS digital camera can be processed to determine whether the telescope 10 is focused or collimated and to determine suitable adjustments to the orientation and/or the position of the secondary mirror 14 to implement correction. Control signals based on these determinations may be sent to the actuators 36 to adjust the secondary mirror 14 accordingly. The control electronics 96 are also preferably configured so as not to permit the telescope 10 to bind, seize, or extend beyond the telescope's operating range. Other features may also be included. As described above, the actuators 36 may be outfitted with position sensors devices as well as encoders 55. These sensors may assist in limiting the movement to within a safe operating range.

The encoder 55 and position sensor devices in the actuators may additionally be employed to move the corrector 18 to a suitable or desired location. For example, pre-programmed focus positions may be stored for multiple users. Upon identifying the user, the telescope 10 may use, for example, the encoder 55 to set the particular longitudinal position of the secondary 14 for that user. The user may identify himself or herself by entering such information into the controller 94.

In other embodiments, the telescope 10 may determine the user's identity through an automated process. For example, the control system 98 may automatically focus and/or collimate the telescope 10 based at least in part upon recognition of a user-identifying characteristic, such as for example a retinal pattern or fingerprint, or through wired or wireless communication with a user-identifying device, such as a radio frequency identification (RFID) tag.

Figure 9B:
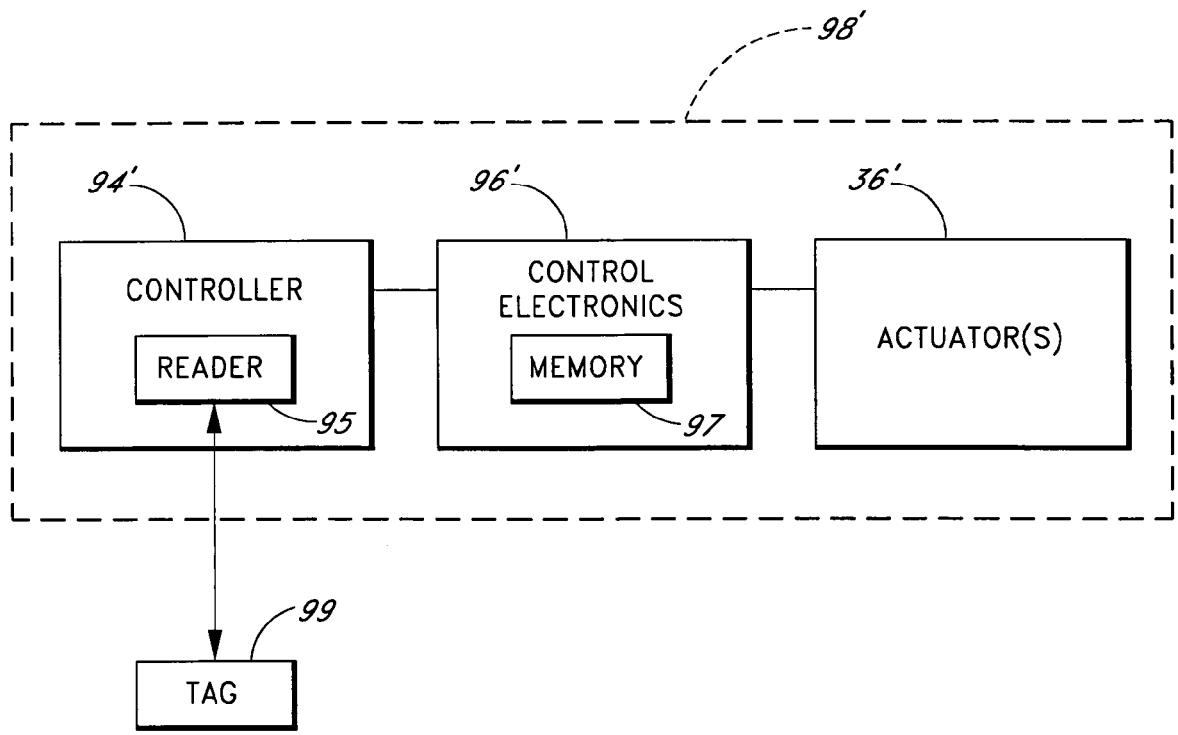
FIG. 9B is a block diagram of an exemplary embodiment of an automated control system capable of communication with an external tag.

FIG. 9B illustrates a block diagram of an exemplary embodiment of a control system 98' usable to focus and/or collimate an optical system, such as an optical system that includes the telescope 10. In certain embodiments, the control system 98' is capable of automatically adjusting the telescope 10, such as through motorized and/or electronically-controlled adjustments, based at least in part upon characteristics of the user. In general, the illustrated control system 98' includes a controller 94' that communicates with control electronics 96' to drive the actuators 36.

As shown, the controller 94' further includes a reader 95 that communicates with a tag 99. In certain embodiments, the reader 95 communicates with the tag 99 through radio frequency (RF) communication. For example, the reader 95 may advantageously comprise an RFID device capable of reading RFID tags. In such embodiments, the tag 99 may comprise a passive or active RFID tag capable of storing identification information, such as for example a unique identification symbol corresponding to a particular user, a group of users, or an optical device such as a camera. Passive RFID tags may advantageously store such identification information while consuming little, if any, power.

In certain embodiments, the tag 99 affixed to a substrate, such as an identification badge, a card, a sticker or other like device associated with a particular user. When the user brings the tag 99 within a certain communication range of the reader 95, the tag 99 receives a signal output by the reader 95 and communicates identification information stored on the tag 99 back to the reader 95. In embodiments of the invention utilizing passive RFID tags, the tag 99 uses power from the reader output signal to transmit or reflect the stored identification information back to the reader 95.

Based at least in part upon the received identification information, the control system 98' is capable of focusing and/or collimating the telescope 10, if needed.

In yet further embodiments, the communication range of the reader 95 may be predetermined to not exceed a certain distance (e.g., one foot) so as to not engage in undesired communication with other tags that may be located in the proximate area. Such a communication range, in some embodiments, may be programmed by the user through adjusting the power of the output signal transmitted by the reader 95.

As illustrated in FIG. 9B, the control electronics 96' further comprise a memory 97 capable of storing data or instructions usable by the control system 98' to adjust the telescope 10. In some embodiments, the memory 97 stores user profile information. For example, the user profile information may include data relating to certain optical adjustments that are associated with to the identification information. Using this stored adjustment information, the control system 98' may automatically adjust the telescope 10, such as by adjusting at least one of the actuators 36, when the reader 95 receives the identification information from the tag 99 of a user. In other embodiments, the control system 98' may access information in the memory 97 to suggest to the user, such as through a user interface, a particular ocular, filter, eyepiece, combinations of the same or the like usable for viewing a designated target. For example, the control system 98' may provide an adjustment or viewing recommendation to the user based on the particular time, the target location or the like.

In certain embodiments, the data stored in the memory 97 is programmable or updatable by a user. In yet other embodiments, the memory 97 is external to the control electronics 96' or the control system 98' may operate without the memory 97.

Although described with reference to particular embodiments, various alternative embodiments of the control system 98' may be used for adjusting the telescope 10. For example, instead of, or in addition to, reading RFID tags, the reader 95 may be configured to read barcodes, magnetic strips, memory cards, broadcast data from a portable computing device (e.g., a PDA or laptop) or the like, infrared communications, biometric information such as fingerprints, retina pattern recognition, other biometrics know to an artisan from the disclosure herein, combinations of the same or the like. In yet other embodiments, the user may manually enter identification information through the controller 94' and/or the control electronics 96'. Such identification information may be used by the control system 98' in place of, or in combination with, receiving identification information through the reader 95.

In certain embodiments, the memory 97 may comprise a database of object identifiers with corresponding focus information, and the actuators 36 may automatically adjust the focus of the telescope 10 depending on which object is being viewed. For example, the user may indicate the object to be viewed. In certain embodiments, the telescope 10 will be equipped with ability to locate that object and may also include automated focusing as described herein. The encoder 55 or other positioning sensing and controlling systems can be employed to control the actuator 36 such that the secondary 14 is moved as desired. Alternatively, the user may specify a distance such as infinity or 30 feet and the controller 94 may process this request and determine the appropriate location of the secondary 14 to provide proper focus for such a distance, In certain embodiments, the telescope 10 can ascertain relevant optical specifications of different components or accessories such as different oculars or photographic and optoelectronic cameras. For example, different devices that may be incorporated into the telescope system may have different focal lengths and thus alter the focusing characteristics of the telescope 10. This information can be employed by the controller 94 to suitably locate the secondary mirror 14 in the appropriate positions to provide an "in focus" image. Such information can be stored on the accessory, e.g., electronically, in certain embodiments.

For example, in certain embodiments, the tag 99 is attached to an ocular (eyepiece or the like) and stores unique identification information associated with the ocular. As described herein, the tag 99 may comprise an RFID tag readable by the reader 95 of the controller 94'. Using the identification information received from the tag 99, the control system 98' can automatically adjust (e.g., focus and/or collimate) the telescope 10 based on adjustment data stored in the memory 97. Such adjustment data may be entered by the user or downloaded from an external source.

For example, if no adjustment data is available for the tagged ocular (such as when the ocular is being used with the telescope 10 for the first time), the control system 98' allows the user to focus the telescope 10 for the tagged ocular. Once the user achieves the desired focus, the control system 98' stores the focus information as adjustment data in the memory 97. When the control system 98' later detects the use of the same tagged ocular, the control system 98' automatically adjusts the telescope 10 using the stored adjustment data. Such a process relieves the user of having to repeatedly make the same adjustments each time he or she uses the telescope 10 and/or a particular ocular. In certain embodiments, such adjustments may also take into account, who or what (e.g., a particular camera) is using the ocular, such as by reading tags associated with the user or the device. Furthermore, the control system 98' may utilize the identification information of multiple tagged oculars or may account for Barlow stacking or the like.

In some embodiments, the control system 98' may automatically make adjustments to the telescope 10 for a user based on stored data for a previous user or group(s) of users. For example, the control system 98' may memorize the adjustment data for a first user or group of users. When a second user accesses the telescope 10, the control system 98' may interpolate the data from the first user or group of users to estimate the proper telescope adjustments for the second user.

In some embodiments, RFID tags advantageously provide a relatively inexpensive means for identifying users of and/or devices for a telescope 10. Furthermore, RFID readers generally do not require line-of-sight communication with the RFID tag, which facilitates detection of the RFID tag and use of a tagged ocular.

Although the tag 99 has been described herein with reference to particular embodiments, other methods or devices usable for automatic recognition may be used with the control system 98'. For example, the tag 99 of the ocular may include bar-coded identification readable by the reader 95. In certain embodiments, the reader 95 may be positioned near a proximal end of the telescope 10 such that when the user inserts and/or screws the ocular into the telescope 10, the reader 95 scans the bar-coded identification. The control system 98' then uses the identification information to adjust the telescope 10 for the particular recognized ocular.

In certain embodiments, the control system 98' is capable of automatically causing front and/or rear adjustments of the telescope 10. For example, the actuator(s) 36 may cause movement of the secondary 14 with respect to the primary 12, and/or may cause movement of the primary 12 with respect to the secondary 14. In yet other embodiments, the actuator(s) may cause movement of both the primary 12 and secondary 14 with respect to each other to achieve desired adjustment results.

The foregoing described embodiments of the control system 98' may provide several advantages to users of the telescope 10. For example, the control system 98' may reduce the amount of manual focusing performed by users and/or decrease the time spent in focusing the telescope 10. This advantageously allows more users to access the telescope 10 in a given period of time. Furthermore, because the control system 98' may decrease the amount of user handling of the telescope 10 (e.g., from manual focusing), the operational life of the telescope 10 may be extended.

Benefits and advantages of the control system 98' may be seen in the following illustrative example, wherein an individual is providing a presentation involving the use of the telescope 10 to a group of participants. As part of the presentation, each of the participants has an opportunity to use the telescope 10 to view a particular target. Furthermore, each of the participants has a tag 99, such as a RFID tag, which includes identification information related to the particular participant. As each participant takes his or her turn to use the telescope 10, the control system 98' reads the tag 99 associated with the particular participant and automatically adjusts the telescope 10 accordingly. Such a system allows the participants to spend more time using the telescope 10 to view particular targets instead of spending time adjusting the telescope 10 to a desired focus and/or collimation.

Although embodiments of the foregoing control system 98' have been described with reference to the telescope 10, a skilled artisan will recognize from the disclosure herein that embodiments of the control system 98' may be used with other optical systems. For example, the control system 98' may be used to adjust microscopes, scopes, sighting devices, binoculars, or the like.

The structure of the logic for various embodiments of the present invention as well as the logic for other designs may be embodied in computer program software. Moreover, those skilled in the art will appreciate that various structures of logic elements, such as computer program code elements or electronic logic circuits are illustrated herein. Manifestly, a variety of embodiments include a machine component that renders the logic elements in a form that instructs the actuators 36 or other apparatus to perform, e.g., a sequence of actions. The logic may be embodied by a computer program that is executed by the processor or electronics as a series of computer- or control element-executable instructions. These instructions or data usable to generate these instructions may reside, for example, in RAM, on a hard drive or optical drive, or on a disc. Alternatively, the instructions may be stored on magnetic tape, electronic read-only memory, or other appropriate data storage device or computer accessible medium that may or may not be dynamically changed or updated. Accordingly, these methods and processes including, but not limited to, those specifically recited herein may be included, for example, on magnetic discs, optical discs such as compact discs, optical disc drives or other storage devices or medium known in the art as well as those yet to be devised. The storage mediums may contain the processing steps which are implemented using hardware, for example, to control motion of the actuators 36, to focus or collimate the telescope 10, and/or the like. These instructions may be in a format on the storage medium that is subsequently altered. For example, these instructions may be in a format that is data compressed.

The controller 94 and control electronics 96 depicted in FIG. 9A represent various non-limiting embodiments of the invention and the control of the actuators 36 can be implemented in other ways as well. For example, a user interface other than the controller 94 may be employed. The user interface may comprise, for example, computer, laptop, palm top, personal digital assistant, cellphone, or the like. Information may be displayed on a screen, monitor, or other display, and/or conveyed to the user via, e.g., audio or tactilely, as well as visually. A keyboard or keypad, or one or more buttons, switches, and sensors can be used to input information such as commands, data, specification, settings, combinations of the same or the like. A mouse, joystick, or other interfaces can be used as well. User interfaces both well known in the art, as well as those yet to be devised may be employed to input and output information and commands.

In addition, some or all of the control electronics may be included in the controller 94 or user interface. For example, in the case where the user interface comprises a computer, laptop, palm top, personal digital assistant, cellphone, or the like, both the interface as well as some or all of the control and processing electronics may be included in the computer, laptop, palm top, personal digital assistant, cellphone, or the like. Additionally, some or all the processing can be performed all on the same device, on one or more other devices that communicates with the device, or various other combinations. The processor may also be incorporated in a network and portions of the process may be performed by separate devices in the network. Processing electronics can be included elsewhere on or external to the telescope 10 and may be included for example in the actuators 36, as well as in or on the tube assembly 40 or elsewhere. The control electronics 96 may be in the form of processors, chips, circuitry, or other components or devices and may comprise non-electronic components as well. Other types of processing, electronic, optical, or other, can be employed using technology well known in the art as well as technology yet to be developed.

In addition, although motors 52 are shown as being used in the actuator 36, other transducers for repositioning or maneuvering the secondary mirror 14 are possible. Other types of motors 52 including, for example, stepper motors, as well as non-motor driven devices and systems such as, e.g., piezo-electric or electromotive devices, hydraulic or pressure driven systems, or the like, may be utilized as well. The particular implementation should not be limited to those described herein as other types of devices and systems for manipulating the secondary mirror 14 may be employed and are within the scope of the present invention.

Figure 10:
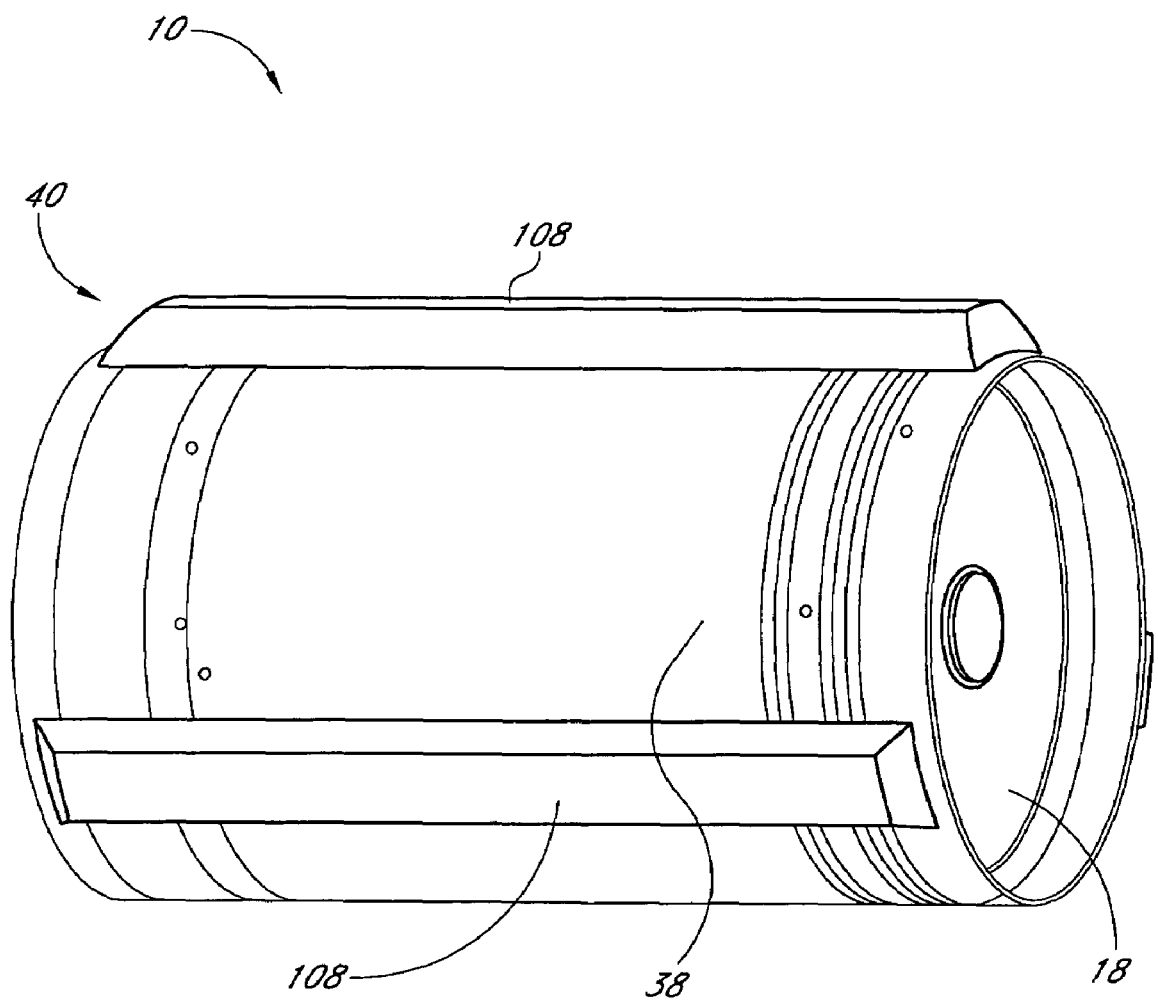
FIG. 10 is a schematic drawing of a tube assembly including conduits for the motor, drive shaft, and drive box assembly for the actuators that manipulate the corrector plate and secondary mirror.

In various embodiments the actuators 36 may extend along the tube 38 as shown in FIG. 10. Electrical and/or mechanical apparatus may be covered by shrouds or conduits 108 on the telescope tube 38. For example, the motor 52, drive shaft 58, and drive box assembly 60 may be enclosed in a shroud. In various embodiments, the tube assembly 40 may be contoured to accommodate such conduits 108. As described above, the telescope tube 38 may comprise, for example, carbon fiber, which preferably reduces thermal drift effects. The conduits 108 may comprise, for example, carbon fiber, vacuum formed plastic or sheet metal. Other materials may be used as well. In other embodiments, conductive paths may be incorporated in the telescope tube 38. Signals other than electrical signals transmitted through conductive lines may be employed to control and/or communicate with the actuators 36. Optical, RF, or other types of signals may be propagated, for example, along waveguides such as optical fibers or may be unguided such as via wireless communication.

The controller 94 and control electronics 96 may be disposed on a tripod 110 below a rotating fork 112 holding the tube assembly 40 as depicted in FIG. 11. The actuators 36, motors 52, drive shafts 58, etc., are hidden from view in this embodiments. The controller 94 and/or control electronics 96 may be disposed elsewhere as well. In various embodiments, for example, control of the actuators 36 may be implemented via optical or RF signals or using other media to communicate with and/or deliver power to the actuators. As described above, the actuators 36 may be controlled by a computer such as a personal computer or a portable device such as a palm-held device or other device, network of devices, or system. Similarly, the control components and/or user interface can be located elsewhere and/or included in a variety of locations.

In addition, the actuator design need not be limited to the configurations described herein. Many variations are possible. For example, in different embodiments different parts that form the actuator 36 may be combined together. For instance, the swivel pin 76 and the swivel yoke 72 may be integrated into a single component or alternatively the swivel pin may be integrated together with the swivel pin block 82 to form a single structure. Similarly, the swivel pin block 82 separated from the corrector cell plate 80 or may be combined together. The drive box assembly frame 62 may possibly be integrated together with the drive assembly mounting plate 84 in some embodiments. In other preferred embodiments, however, these are separate components fastened together with suitable connectors or fasteners such as bolts and screws. Additionally, these components may be broken up into more or less component parts. Additional parts and features may also be added or components or design aspects may be removed. The design of the individual parts may be different or may be supplemented with additional components in other embodiments. Similarly, the connection between the components may be varied. For example, the connection between the actuator 36 and the secondary 18 may be different. For instance, the actuator 36 may be physically connected to the primary 12 through the drive assembly mounting plate 84 and the tube assembly 40 (including the telescope tube 38 and the rear cell 44) as well as other mounting components. In certain embodiments, the actuator 36 may be mechanically connected to the secondary 14 through the corrector plate 18 and any device used to connect these two optical elements as well as through the corrector cell 46 and the corrector cell plate 80. Alternatively, the actuators may be connected to the secondary 14 through support structures other than the corrector such as optical flats, vanes beams, etc., as discussed above. Additional components may be included to form mechanical connection between the actuator 36 and the primary 12 and between the actuator and the secondary 14. Alternatively, the physical connections may be formed otherwise, with less or more or different intervening components.

Other arrangements and designs may be employed including those based on conventional approaches to translation and positioning as well as translation and positioning concepts yet to be devised. Preferably, however, the actuators 36 are configured so as to prevent or reduce the likelihood of binding or seizure. Accordingly, three or more degrees of freedom may be provided. In other embodiments, however, more or less degrees of motion may be available with different designs. The actuators 36 may comprise metal components such as aluminum or stainless steel and may also include substantially temperature invariant materials such as Invar, which is substantially resistant to temperature induced changes. These components may be machined, molded, or otherwise manufactured. Also, although three actuators are shown, the number of actuators need not be limited to three. For example, one or two, or four or more actuators may be employed in different designs although three may be preferred. The location of the actuators 36 may also vary. Damping, shock absorption, vibration isolation, noise reduction or other features may also be included in various embodiments.

As described above, the user may actively focus and collimate the telescope 10 or a system may be included to automate the processes for focusing and collimation. In various embodiments, to focus, the telescope 10 is directed at the appropriate target object and is imaged. The image may be evaluated by measuring, e.g., the resolution, blur, or other figure of merit to determine whether the image is in focus. The actuators 36 may adjust the position of the corrector 18 and secondary 14 to improve the focus. Measurements of the image quality, blur, resolution, or the like, can assist in such repositioning of the secondary 14, and corrector 18 until a suitably focused image is obtained.

In the case where the telescope 10 is substantially focused and well collimated, an airy disc pattern preferably having substantially all optical energy in a central peak as schematically represented in FIG. 12, may be formed at the focal plane 16. In some cases, this airy disc may comprise a plurality of concentric circular and/or annular bright portions. A substantial portion of the light, however, is preferably distributed in a peak at the center of the circularly symmetric pattern. The intensity may oscillate with distance away from the center resulting in annular peaks or rings. However, superimposed on this oscillation is a general decrease in intensity with distance from the center, the rings farther from the center being less bright than those closer to the center. In some preferred embodiment, these rings are absent as described above. A telescope 10 yielding such a pattern may not require focusing or collimation or adjustment of the secondary mirror 14 as the telescope may already be sufficiently focused and collimated. A user therefore observing a pattern during the focusing or collimation process that is indicative of proper focusing and collimation, such as for example an airy disc pattern, may conclude that the telescope 10 is properly focused and collimated. Similarly, if an automated system is employed, an airy disc pattern at the focal plane may be imaged by an optoelectronic detector or other image detection scheme. Image processing electronics 96 may assess the level of focus and collimation from the pattern obtained. This airy disc pattern may suggest to the processor that the level of focus and collimation is sufficient, and thus the control electronics 96 may refrain from introducing additional correction by manipulating the secondary mirror 14.

If, however, the primary and/or secondary mirrors 12, 14 are improperly focused or collimated, such deviations will preferably be indicated by features in the detected pattern. For example, if the primary and/or secondary mirrors 12, 14 are displaced from each other by too large or too small a longitudinal distance along the optical axis 20, the image may be out of focus. A pattern representing "defocus" is schematically illustrated in FIG. 13. As shown, more optical energy is shifted from the central peak and into the rings as compared to the image in FIG. 12. Similarly, the fall-off in brightness of the rings with increasing distance from center may be replaced with other irregular variations in the brightness of the rings. For example, one or more outer rings may be more intense than inner rings.

If the user observes a pattern indicating that the optical system is not properly focused, the user may adjust the longitudinal position of the secondary mirror 14 along the optical axis 20. In certain embodiments, for example, the user may use the controller 94 to translate the secondary 14 in the appropriate direction along the optical axis 20. As described above, this process may be automated in certain embodiments. The pattern obtained may be processed to determine whether the telescope 10 is sufficiently focused and possibly to quantify the amount of "defocus." In certain embodiments, an intensity distribution may be obtained by a camera comprising, e.g., an optoelectronic camera. In the case where the telescope 10 is focused, the intensity pattern may correspond to a narrow peak. In contrast, defocus may be indicated by broader or wider peak as measured for example by full width half maximum. The control electronics 96 may direct the actuators 36 to translate the secondary mirror 14 to or away from the primary 12. The pattern can be monitored in some embodiments to determine when the level of focus is suitable. Other techniques can be employed as well to focus the telescope 10.

In various embodiments, to collimate the telescope 10 a distant point source is imaged and a pattern is produced on the focal plane 16 of the telescope. The primary and/or secondary mirror 12, 14 may be canted or angled in a manner that may introduce image degradation. Light from a distant point source focused on the focal plane 16 of the telescope 10 may produce a representative pattern on the focal plane such as schematically depicted in FIG. 14. Skewed alignment of the primary 12 and/or the secondary 14 may, for example, cause the pattern to be elongated. In comparison with the image in FIG. 12, for instance, the pattern shown in FIG. 14 is not circularly symmetric. Instead, the pattern in FIG. 14 comprises a central bright elliptical region and elliptical rings laterally offset from this central bright ellipse. The image may also be out of focus causing the intensity distribution to deviate from the more characteristic pattern associated with the airy disc. As described above, the airy disc pattern has a generally downward fall-off superimposed on intensity oscillations that results in a set of bright rings that reduce in intensity with distance from the center.

To improve or correct the collimation of the telescope 10, the secondary mirror 14 may be tipped or tilted appropriately. A user, for example, observing a pattern indicative of misalignment, such as schematically represented in FIG. 14, may, using the keys on the controller 94, activate the actuators 36 to achieve suitable correction. As described above, the control electronics 96 may receive signals from the user as to which direction correction is to be introduced. The control electronics 96 may determine from the user's instructions the appropriate actuator movements to implement the suitable adjustments to the secondary mirror 14. The user may monitor the pattern and may continue to indicate with the controller 94 the desired correction. The control electronics 96 may drive the actuators 36 accordingly. In this manner, improved collimation may result.

In other embodiments, the collimation process may be more automated. As described above, the pattern at the focal plane produced by the distant source may be processed to determine appropriate correction. In response to a pattern such as schematically represented in FIG. 14, for example, the control electronics 96 may determine how to manipulate the secondary mirror 14 to collimate the telescope 10. The control electronics 96 may send signals to the actuators 36 to move in an appropriate manner to provide suitable tilt or tipping. In the case where the image is also out of focus, the control electronics 96 may also direct the actuators 36 to include appropriate longitudinal translation components. The pattern may be monitored to ascertain whether collimation has been achieved or whether additional correction should be introduced.

In various embodiments, the telescope 10 may be moved in conjunction with movement of the secondary mirror to track the celestial object used for example, during collimation. Such an arrangement may avoid losing track of the celestial object which may potentially jump out of the field-of-view with adjustments to the secondary mirror 14 made in collimating the telescope 10. In such embodiments, for example, feedback from the actuators 36 or encoders or other components that monitor the position and movement of the secondary 14 and/or corrector 18 may be directed to control electronics that control positioning and tracking of the telescope 10. The electronics may be employed to determine the amount and direction of object shift and may automatically introduce proper movement and suitably reorient of the telescope 10. In various embodiments, for example, the control electronics may direct the rotating fork 112 to rotate and cant the telescope tube 38 to continue to maintain the celestial object in the field-of-view. Other configurations and approaches are possible.

Variations in the focusing and collimation processes may exist. Other techniques can be employed to determine whether the telescope 10 is focused or collimated. Automation may or may not be applied to different extents and the automated systems or approaches may vary. Different types of processing may be performed as well to focus or collimate the telescope 10.

Also, one skilled in the art will appreciate that the drawing in FIGS. 12-14 are only schematic and are for illustrative purposes. A telescope 10 that is not focused and that is not properly collimated or that is misaligned may produce a pattern that includes other features as well. The actual patterns produced may vary in other ways also.

In certain embodiments, a heater 100 may heat the corrector 18 and/or secondary mirror 14. Such a heater 100, which may be useful for reducing condensation on the corrector 18 or other support structure such as optical flat or non-corrector optic, is shown in FIGS. 7 and 8. Preferably, the corrector cell 46 is largely separated from the telescope tube 38 and the remainder of the telescope tube assembly 40 by a substantially thermally insulating region, which reduces thermal conduction from the corrector cell 46 to the telescope tube and the remainder of the tube assembly. For example, in FIG. 7, the corrector cell 46 is connected to the telescope tube 38 and the reminder of the telescope tube assembly 40 via the three actuators 36. Three point connection is provided. The actuators 36 are located about a perimeter surrounding the tube assembly 40 and corrector cell 46. As shown in FIG. 7, these actuators 36 are spaced apart azimuthally about the corrector 18 by about 120 degrees although other angles may be employed. The actuators 36 may be spaced at regular or irregular angular intervals and may be symmetrically or non-symmetrically disposed about the tube assembly 40. Preferably, a gap separates the corrector cell 46 from the front cell 42 in these regions between the actuators 36. This gap may be an air gap that permits tipping and tilting and other movement of the corrector 18 and secondary mirror 14 during, e.g., collimation. Alternatively, flexible and preferably thermally low conductive or insulating cover may be provided such that the corrector 18 may be tipped or tilted several degrees. Accordingly, the primary physical and thermal contact between the front cell 42 and the corrector cell 46 is through the actuator components such as the swivel yoke 72, swivel pin 76, and swivel pin block 82. In certain embodiments, a component such as a dust curtain or skirt may bridge the otherwise substantially open regions between the front cell 42 and the corrector cell 46. Preferably, however, this component is substantially thermally insulating and/or poor thermal contact is made between this component and either the corrector cell 46 and/or other portions of the telescope 10. Accordingly, thermal energy is not readily conductively transferred through this component (e.g., skirt or curtain) from the heated corrector cell 46 to the front cell 42 or other portions of the telescope 10.

In embodiments not employing actuators 36, the corrector cell 46 may nevertheless be substantially separated from the remainder of the telescope tube assembly 40 and heated. The corrector cell 46 may be connected to the telescope tube 38 at a limited range of points. Preferably, a plurality of connectors connect the corrector 18 to the telescope tube 38. The plurality of connectors are preferably spaced apart around the corrector 18 and the corrector is separated from the telescope tube 38 by substantially thermally insulating regions between these spaced apart connectors. As described above, the actuators 36 may be spaced apart about the corrector 18 by intervals other than shown in FIG. 7. These connectors may or may not be evenly spaced about the corrector 18 and telescope tube 38 and more or less connectors may be employed.

Insulating regions may be disposed between the connectors. These regions may comprise air gaps or thermally insulating material or media in certain embodiments. The contact between the corrector cell 42 and the remainder of the telescope tube assembly 42 is thereby reduced. This configuration decreases the amount of thermal energy in the corrector cell 46 that is lost by thermal conduction to the remainder of the telescope 10. The heater 100 may therefore more efficiently heat the corrector 18 (or other support structure such as optical plate or optical element supporting the secondary 14) as the amount and size of the heat conduction paths to the remainder of the telescope 10 is substantially reduced.

This heater 100 preferably provides a source of heat for the corrector 18 and possibly secondary mirror 14. The heater 100 may comprise a heating element in thermal and physical contact with the corrector cell 46. This heating element may be in thermal and physical contact with the corrector 18 and may be secured thereto by a variety of techniques. In some embodiments, one or more substantially thermally conducting components may separate the heating element and the corrector. In various preferred embodiments, the heater 100 comprises a resistive heater such as a heat strip, heat tape, or other type of heating element. For example, a heat strip or heating tape may be applied to a perimeter of the corrector 18. Other methods of heating the corrector 18 (and/or possibly the secondary 14) may be employed as well.

As described above, air gaps or other thermally insulating regions preferably are disposed between the corrector 18 and/or secondary 14 and the telescope tube 36 or other portions of the tube assembly. These substantially thermally insulating regions may provide thermal insulation reducing thermal conduction from the corrector cell 46 to, for example, the front cell 42 or other portions of the telescope 10. A substantial portion of the thermal energy will therefore preferably remain in the corrector cell 46 thereby permitting the heater 100 to more efficiently heat the corrector plate 18.

Less energy will therefore be required to heat the corrector 18 to abate the accumulation of condensation.

In certain preferred embodiments, where the corrector cell 46 is substantially thermally isolated from the front cell 42, connection between the front cell and the corrector cell is provided by the actuators 36 described above. In such cases where actuators 36 control the position of the corrector 18 and secondary 14, the controller 94 may adjust the position of the secondary to compensate for thermal shifts possibly due to thermal expansion resulting from heating the corrector and/or secondary. Other arrangements are also possible.

The various embodiments described herein may offer some useful advantages. Telescopes may be focused and collimated more conveniently and potentially more accurately. The user can focus and collimate the telescope 10 quicker, with less difficulty and possibly remotely. The process may also be automated in full or in part. By moving the telescope 10 in conjunction with adjustments to the secondary mirror 14, abrupt jumps in the pattern at the focal plane that is used to evaluate collimation in certain embodiments may be reduced or avoided altogether. Accordingly, a camera such as an optoelectronic detector may be used in the collimation process. Moving the secondary 14 at the perimeter of the telescope tube assembly may reduce obstruction of light reaching the primary and thus collected by the telescope. In many telescope designs, the secondary mirror 14 and corrector 18 together weigh less than the primary 12. Thus, moving the corrector 18 and secondary 14 together is easier than moving the primary 12. Movement of the corrector 18 preferably causes only negligible, if any, reduction in the image quality as the corrector does not bend the beam substantially. The primary 12 can also be rigidly fixed in place, for example, with cement, epoxy, glue, or silicon couching, combinations of the same or the like. Fixing the primary reduces shift in the image formed in comparison to designs where the primary is not securely fixed in place but moves. Disadvantageous vibration of the primary 12 may therefore be reduced. In other embodiments, the primary 12, secondary, 14, or corrector 18 or other support structure for the secondary, or any combination thereof can be manipulated and controlled by one or more actuators 36.

While certain preferred embodiments of the invention have been described, these embodiments have been presented by way of example only, and are not intended to limit the scope of the present disclosure. Various modifications and applications may occur to those skilled in the art without departing from the true spirit and scope of the disclosure as defined in the appended claims.

What is claimed is:

1. A telescope capable of adjusting its optical properties based on recognized data, the telescope comprising:
   a least one optical lens;
   an actuator operatively coupled to the optical lens and capable of adjusting the optical lens to a first focused position;
   a radio frequency identification (RFID) reader device configured to receive identification information from at least one RFID information element, the RFID reader device further configured to output a first signal based at least upon the identification information; and
   control electronics capable of receiving the first signal and outputting one or more control signals causing the actuator to adjust the optical lens to a second focused position based at least in part on the identification information.

2. The telescope of claim 1, further comprising a database capable of storing focus adjustment data indicative of the identification information.

3. The telescope of claim 2, wherein the identification information is associated with at least one user profile.

4. The telescope of claim 2, wherein the identification information is associated with at least one eyepiece.

5. The telescope of claim 2, wherein the identification information is associated with at least one imaging device.

6. The telescope of claim 1, further comprising an eyepiece.

7. The telescope of claim 6, wherein the RFID information element is attached to the eyepiece.

8. The optical system of claim 1, wherein the at least one RFID information element comprises a RFID tag.

9. A method of providing an optical system capable of identification recognition, the method comprising:
   providing a telescope;
   providing one or more electronically-controlled actuators capable of adjusting the telescope to a first focus;
   providing a controller module capable of receiving identification information, wherein the controller module comprises a radio frequency identification (RFID) reader configured to receive at least a portion of the identification information from at least one RFID tag; and
   providing an electronic module capable of outputting one or more control signals causing the one or more actuators to correct the focus of the telescope to a second focus based at least upon the identification information received by the controller module.

10. The method of claim 9, wherein the identification information further comprises biometric information.

11. The method of claim 9, wherein the identification information corresponds to a user.

12. The method of claim 11, wherein the identification information corresponds to a group of users having a predetermined similar characteristic.

13. The method of claim 9, wherein the identification information corresponds to an imaging device usable with the telescope.

14. The method of claim 9, wherein the identification information corresponds to an eyepiece usable with the telescope.

15. The method of claim 9, wherein the identification information corresponds to a predetermined focal length.

16. The method of claim 9, further comprising providing a memory capable of storing focus adjustment data associated with the identification information.

17. A system for adjusting the optical properties of a telescope based on recognized data, the system comprising:
   means for adjusting at least one optical lens, wherein the means for adjusting is capable of adjusting the at least one optical lens to a first focused position;
   means for receiving identification information from at least one radio frequency identification (RFID) tag, the means for receiving capable of outputting a first signal based at least upon the identification information; and
   means for receiving the first signal and outputting one or more control signals causing the means for adjusting to adjust the at least one optical lens to a second focused position based at least upon the first signal.

18. A telescope capable of adjusting its focus based on information obtained about a user of the telescope, the telescope comprising:
   an electronic focusing mechanism capable of adjusting the telescope to move a focal point of the telescope; and control electronics capable of receiving information from a radio frequency identification (RFID) information element associated with at least one of a user and an optical element, the control electronics further capable of directing the electronic focusing mechanism to move the focal point based on the information.

19. The telescope of claim 18, further comprising:

an elongated tube with proximal and distal ends;

a primary optical element disposed at the proximal end of the elongated tube;

a corrector plate disposed at the distal end of the tube assembly; and a secondary optical element affixed to the corrector plate.

20. The telescope of claim 19, wherein the electronic focusing mechanism comprises at least one actuator capable of moving the corrector plate and the secondary optical element with respect to the primary optical element to move the focal point of the telescope.

21. The telescope of claim 20, wherein the at least one actuator is coupled to the corrector plate.

22. The telescope of claim 21, wherein the at least one actuator is coupled to a periphery of the corrector plate.

23. The telescope of claim 19, wherein at least one of the primary and secondary optical elements comprises a mirror.

* * * * *